United States Patent
Kanazumi et al.

[11] Patent Number: 5,441,205
[45] Date of Patent: Aug. 15, 1995

[54] APPARATUS FOR WATER-GRANULATING SLAG

[75] Inventors: Hisao Kanazumi; Akiyoshi Yamashiro; Kiyoshi Fujiwara, all of Kagawa, Japan

[73] Assignee: Mitsubishi Materials Corporation, Tokyo, Japan

[21] Appl. No.: 266,469

[22] Filed: Jun. 27, 1994

[30] Foreign Application Priority Data

Jun. 30, 1993 [JP] Japan .................. 5-187147
Sep. 8, 1993 [JP] Japan .................. 5-223734

[51] Int. Cl.6 .................. B02C 19/12; F27D 15/02
[52] U.S. Cl. .................. 241/41; 241/301
[58] Field of Search ............. 241/1, 20, 23, 41, 301

[56] References Cited

U.S. PATENT DOCUMENTS

| | | | |
|---|---|---|---|
| 3,615,329 | 10/1971 | Jones, Jr. .................. | 241/1 X |
| 4,909,821 | 3/1990 | Olginsky et al. ............ | 65/141 |
| 4,909,837 | 3/1990 | Hansen et al. .............. | 75/24 |

FOREIGN PATENT DOCUMENTS

| | | |
|---|---|---|
| 0043605 | 1/1982 | European Pat. Off. . |
| 0082279 | 6/1983 | European Pat. Off. . |
| 2284677 | 4/1976 | France . |
| 4302993 | 10/1992 | Japan . |
| 4302994 | 10/1992 | Japan . |

Primary Examiner—Irene Cuda
Assistant Examiner—John M. Husar
Attorney, Agent, or Firm—Oblon, Spivak, McClelland, Maier & Neustadt

[57] ABSTRACT

An apparatus is disclosed for water-granulating slag being discharged from a discharging launder. The apparatus includes a receiving launder arranged below the discharging launder. The receiving launder has opposite side walls to define a widthwise space therebetween. A water-jetting device is provided to jet granulating water to the slag, being discharged from the discharging launder, to water-granulate the slag. The jetting device includes a plurality of partitioning plates arranged in the receiving launder so as to span the widthwise space between the side walls thereof and spaced from each other so as to define a plurality of water outlets, and a water supplying unit for supplying the granulating water into the water outlets to be jetted therefrom against the slag.

20 Claims, 6 Drawing Sheets

APPARATUS FOR WATER-GRANULATING SLAG

BACKGROUND OF THE INVENTION

1. Field of the Invention

The present invention pertains to an apparatus for water-granulating slag produced during smelting and/or converting operations of nonferrous metals.

2. Related Art

As is well known in the art, high-temperature slag, which may contain, as principal components, iron oxide and calcium oxide, or iron oxide and silicon dioxide, is produced in a metallurgical furnace such as a converter in the dry copper smelting process. After the separation from matte, slag of this kind is crushed into granules by bringing it into contact with a large amount of water to effect rapid quenching. This operation is, in general, called "water-granulation" or "granulation".

Japanese Patent Applications, Laid-Open Nos. H4-302993 and H4-302994, disclose conventional granulation apparatuses of the aforesaid type, which will be hereinafter explained with reference to FIGS. 1 and 2.

Figure 1:
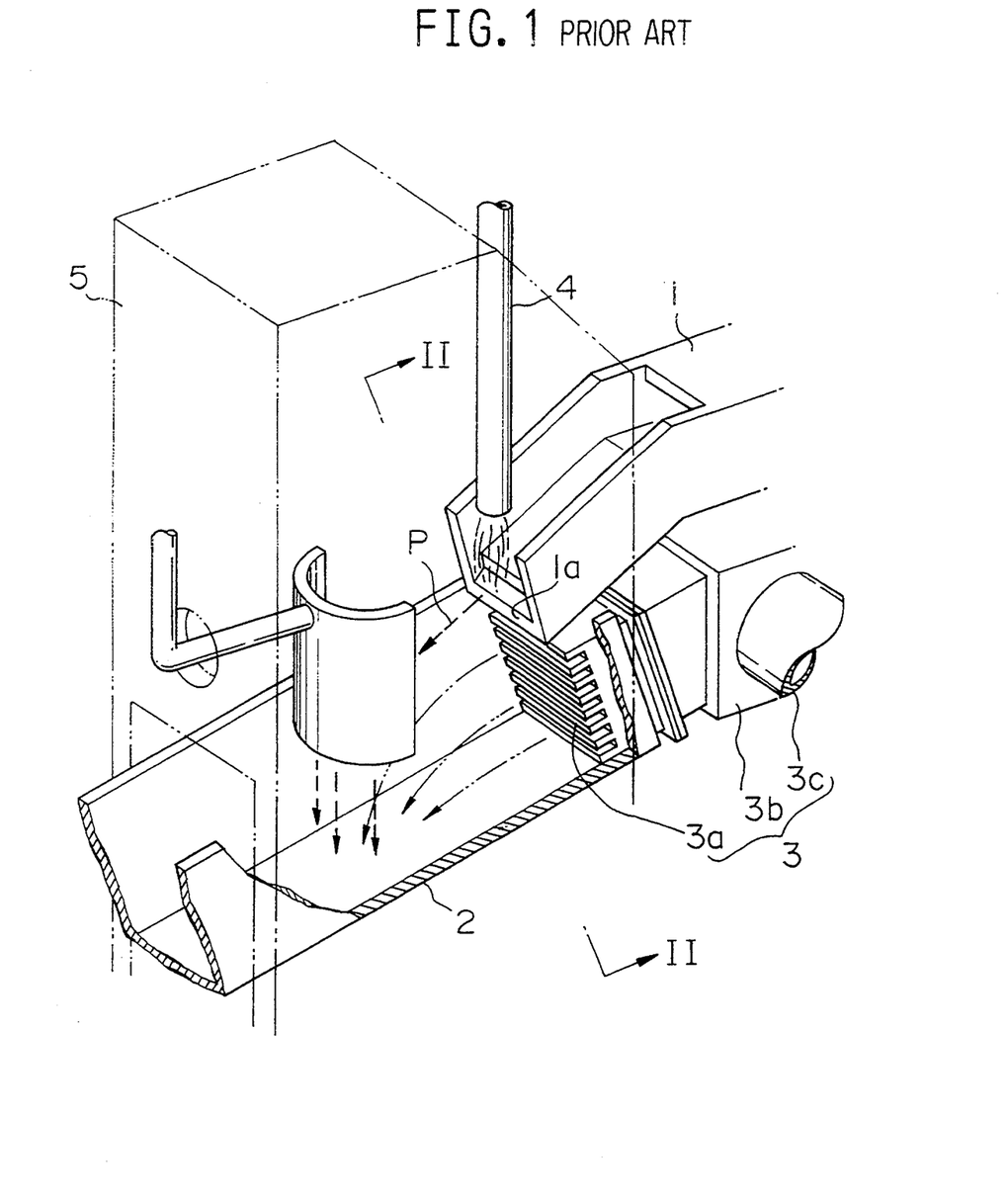
FIG. 1 is a partially cut-away perspective view of a conventional water-granulation apparatus of slag.
Figure 2:
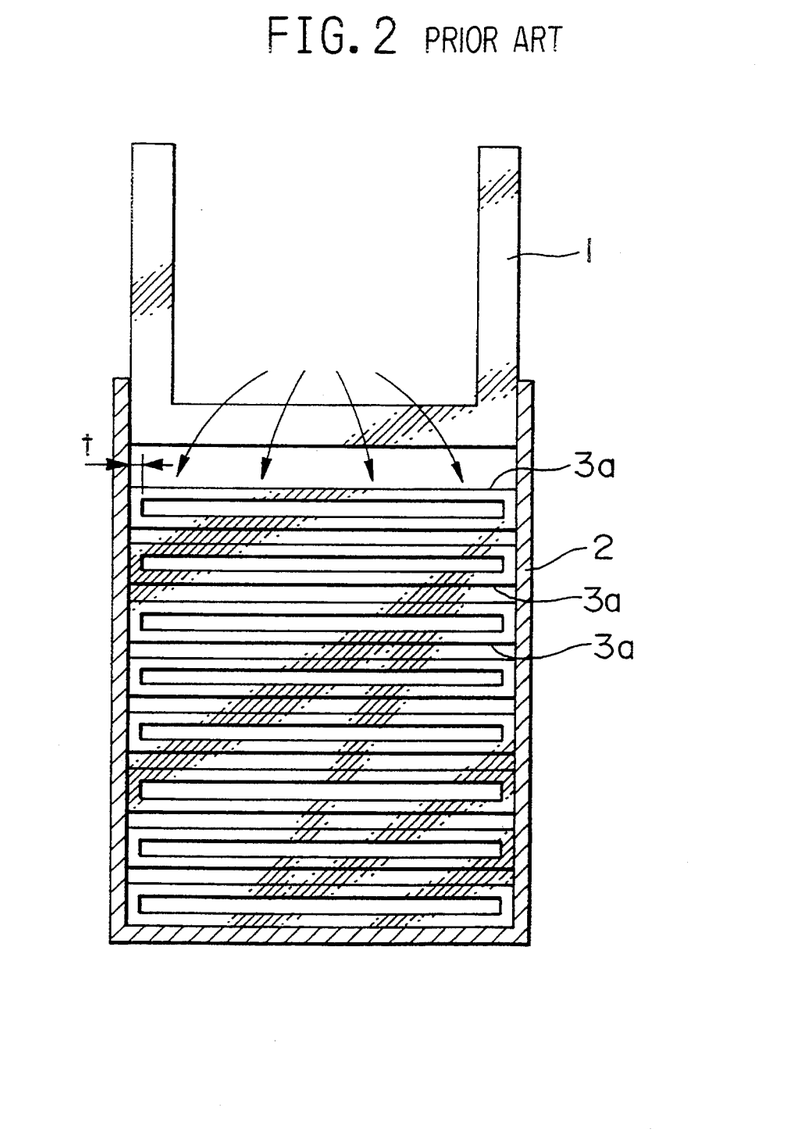
FIG. 2 is a schematic transverse cross-sectional view of the apparatus of FIG. 1, taken along the line II—II in FIG. 1.

As depicted in FIG. 1, the conventional granulation apparatus includes a discharging launder 1 for discharging slag produced during smelting and/or converting operations; a receiving launder 2 arranged below the downstream end 1a of the discharging launder 1 so as to extend in a discharging direction of the slag as indicated by the arrow P in FIG. 1; and a water-jetting device 3 for jetting granulating water towards the slag, being discharged from the discharging launder 1 to the receiving launder 2. The water-jetting device 3 is constructed to have a large number of elongated water nozzles 3a (see FIG. 2), a water-supplying tubular member 3b connected to the nozzles in fluid communication therewith, and a water conduit 3c connected to the tubular member 3b at its lateral side so as to be in fluid communication therewith. The granulation apparatus further includes a burner 4 for heating a zone proximate to the discharging end 1a of the discharging launder 1 and an explosion-proof hood 5 for covering such a zone to prevent slag from being scattered in case of the occurrence of a phreatic explosion.

In the conventional apparatus as described above, a great amount of granulating water is supplied into the water nozzles 3a via the conduit 3c and the tubular member 3b. The granulating water thus supplied is jetted out from the nozzles 3a at a high jetting rate in a direction in which the receiving launder 2 extends, and contacts the high temperature slag, falling from the discharging end 1a of the discharging launder 1. Thus, the slag is rapidly quenched and crushed into granules which have a size of the order of several millimeters.

In the conventional apparatus, however, since the water nozzles 3a are of a rectangular tubular shape having a thickness t (see FIG. 2), the granulating water jelled therefrom passes a zone somewhat displaced inwardly from the inner surface of the receiving member 2, and hence it becomes difficult for the water to contact the inner surfaces of the receiving launder 2, especially the upper portions thereof. As a result, the slag contacts and adheres to the inner surfaces of the receiving launder 2 without being granulated by the water. If water contacts the lumps of slag adhering to the receiving member, phreatic explosions may occur.

SUMMARY OF THE INVENTION

It is therefore an object of the present invention to provide a water-granulation apparatus for slag, by which the slag is prevented from adhering to a receiving device, to obviate the occurrence of phreatic explosions.

According to the invention, there is provided an apparatus for water-granulating slag, comprising:
- a receiving device having an upwardly directed opening for receiving slag discharged during smelting and/or converting operations, the receiving device having opposite side plates to define widthwise space therebetween; and
- a water-jetting device attached to the receiving device for jetting granulating water to the slag, being discharged into the receiving device, to water-granulate the slag,
- wherein the water-jetting device includes a plurality of partitioning plates arranged in the receiving device so as to span the widthwise space between the side plates thereof and spaced from each other so as to define a plurality of water outlets, and a watersupplying unit attached to the receiving device for supplying the granulating water into the water outlets, whereby the granulating water supplied from the water-supplying unit is jelled from the water outlets against the slag.

In the foregoing, the receiving device may include a receiving launder having upstream and downstream ends and inclined downwardly from the upstream end to the downstream end, and wherein the partitioning plates are disposed at the upstream end of the receiving launder to permit the granulating water to be jetted from the upstream end towards the downstream end. The water-granulating apparatus further includes a discharging launder for discharging the slag into the receiving launder. The discharging launder has a discharging outlet which is arranged above the upstream end of the receiving launder such that the discharging outlet is slightly shifted downstream from the end of the receiving launder. The receiving launder has an inner width greater than the discharging launder, and the opposite side plates thereof may be formed so as to be inclined outwardly in an upward direction. The discharging launder may have a terminal end defining the discharging outlet.

Furthermore, an explosion-proof hood is arranged adjacent to the receiving launder and the discharging launder for surrounding a zone adjacent to the discharging outlet of the discharging launder, whereby the slag, being discharged from the discharging launder into the receiving launder, is prevented from being scattered around in case of a phreatic explosion. The aforesaid explosion-proof hood may include a horizontal upper wall having an openable inspection hole formed therethrough and a scaffold provided thereon for access to the inspection hole. An aperture may be formed through the side wall of the explosion-proof hood in order to enable the operator to carry out the removing operation of accretion adhering to the discharging outlet of the discharging launder therethrough. Additionally, a cooling unit may further be provided in order to supply cooling water along the inner wall surfaces of the hood.

DESCRIPTION OF THE PREFERRED EMBODIMENTS OF THE INVENTION

Figure 3:
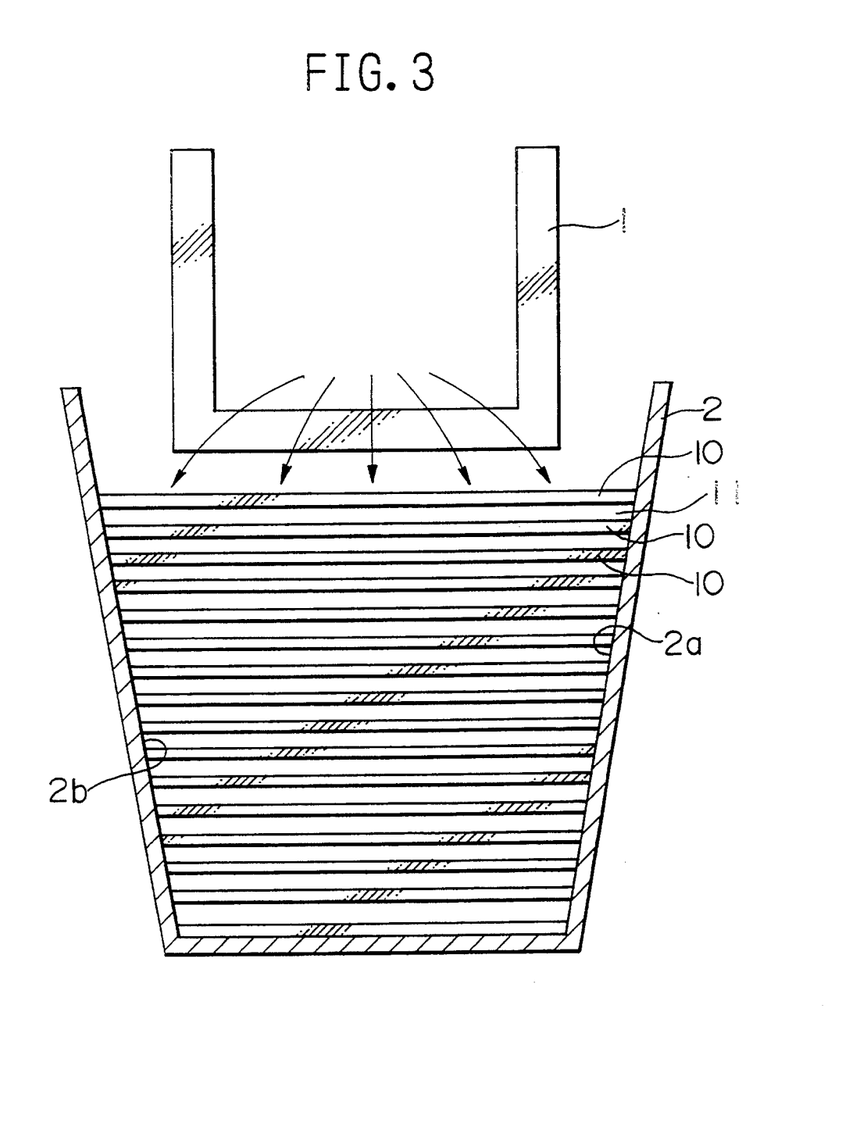
FIG. 3 is a view similar to FIG. 2, but showing a water-granulation apparatus in accordance with a first embodiment of the present invention.

A water-granulation apparatus for slag in accordance with a first embodiment of the present invention differs from the conventional apparatus only in the structure as depicted in FIG. 3, and hence FIG. 1 is hereinafter used in order to specify the remaining construction of the apparatus.

In the water-granulation apparatus of the invention, the receiving launder (receiving device) 2 includes upstream and downstream ends, and is inclined downwardly from the upstream end to the downstream end. As specifically seen from FIG. 3, the receiving launder 2 has opposite side plates 2a and 2b defining widthwise space therebetween and sloping outwardly in an upward direction such that it has an inner width greater than the discharging launder 1. In the present invention, the water-jetting device 3 includes a plurality of partitioning plates 10 instead of the water nozzles 3a. The partitioning plates 10 are arranged in the receiving launder 2 at its upstream end so as to span the widthwise space between the opposing side plates 2a and 2b thereof, with the opposite ends of a respective partitioning plate being welded to the inner surfaces of the side plates of the receiving launder 2, and are spaced from each other so as to define a plurality of water outlets 11 of a constant width between respective adjacent partitioning plates 10. Furthermore, as is the case with the conventional apparatus, a tubular member 3b, to which a water conduit 3a is connected, is connected to the upstream side of the partitioning plates 10. In the foregoing, it is preferable that the partitioning plates 10 as well as the receiving launder 2 be formed of stainless steel.

In the apparatus as described above, granulating water is supplied into the water outlets 11 via the conduit 3c and the tubular member 3b. The granulating water thus supplied is jelled out from the water outlets 11, defined between the respective adjacent partitioning plates 10, in a direction in which the receiving launder 2 extends, and contacts the high temperature slag, being discharged from the discharging end 1a of the discharging launder 1 towards the receiving launder 2. Thus, the slag is rapidly quenched and water-granulated.

In the granulation apparatus as described above, since the partitioning plates 10 defining elongated water outlets 11 are utilized instead of water nozzles of a tubular shape, the granulating water, jelled out from the water outlets 11, immediately comes into contact with the side walls 2a and 2b of the receiving launder 2. Thus, the granulating water is positively jetted even against the zone proximate to the upper end of the receiving launder 2, i.e., the region where the slag remains ungranulated in the conventional apparatus, to avoid direct contact of the slag to the receiving launder 2, and the slag can be completely granulated without adhering to the receiving launder 2. Accordingly, phreatic explosions can be prevented from occurring.

Figure 4:
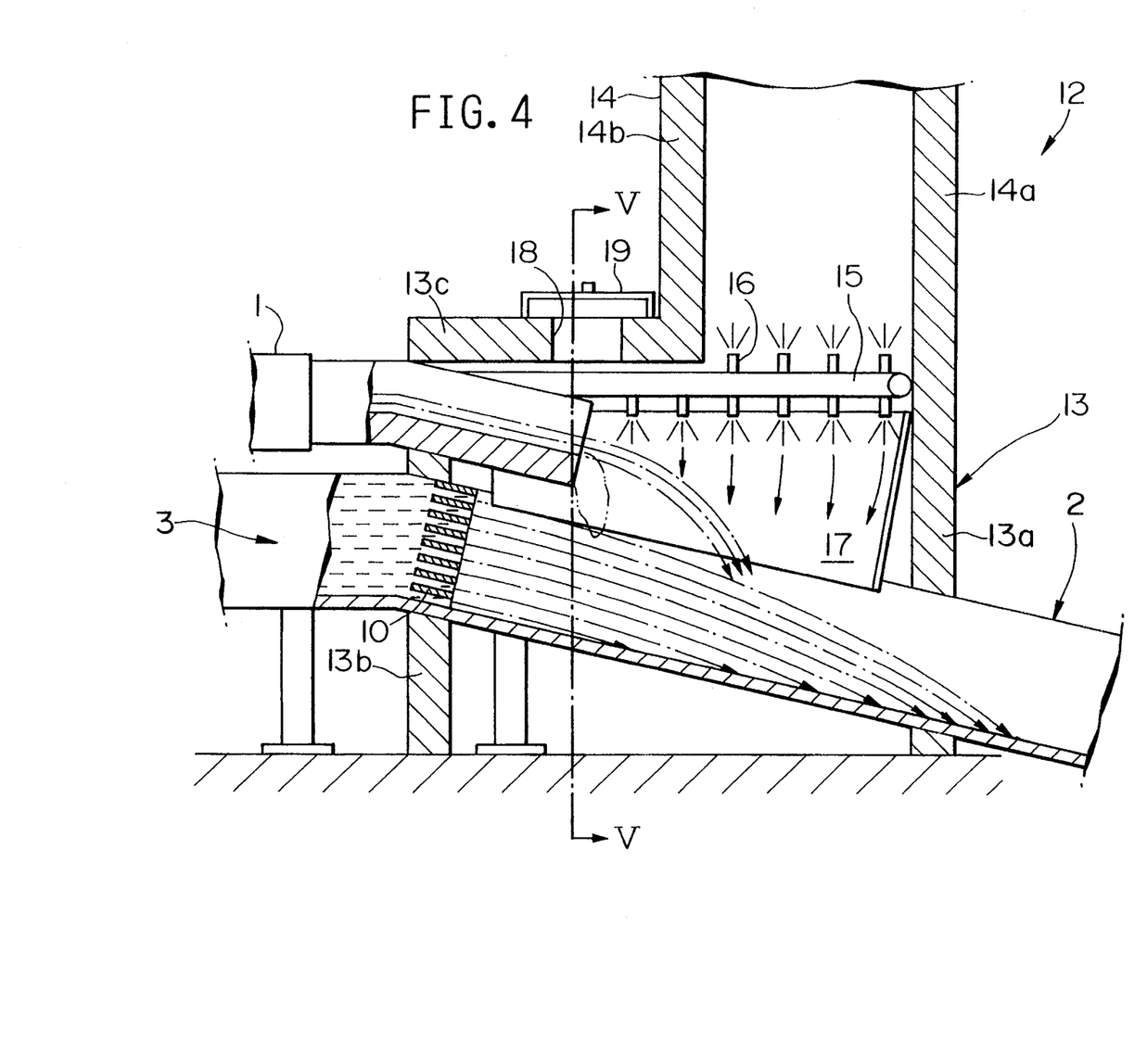
FIG. 4 is a longitudinal cross-sectional view of a water-granulation apparatus of slag, in accordance with a second embodiment of the invention.
Figure 5:
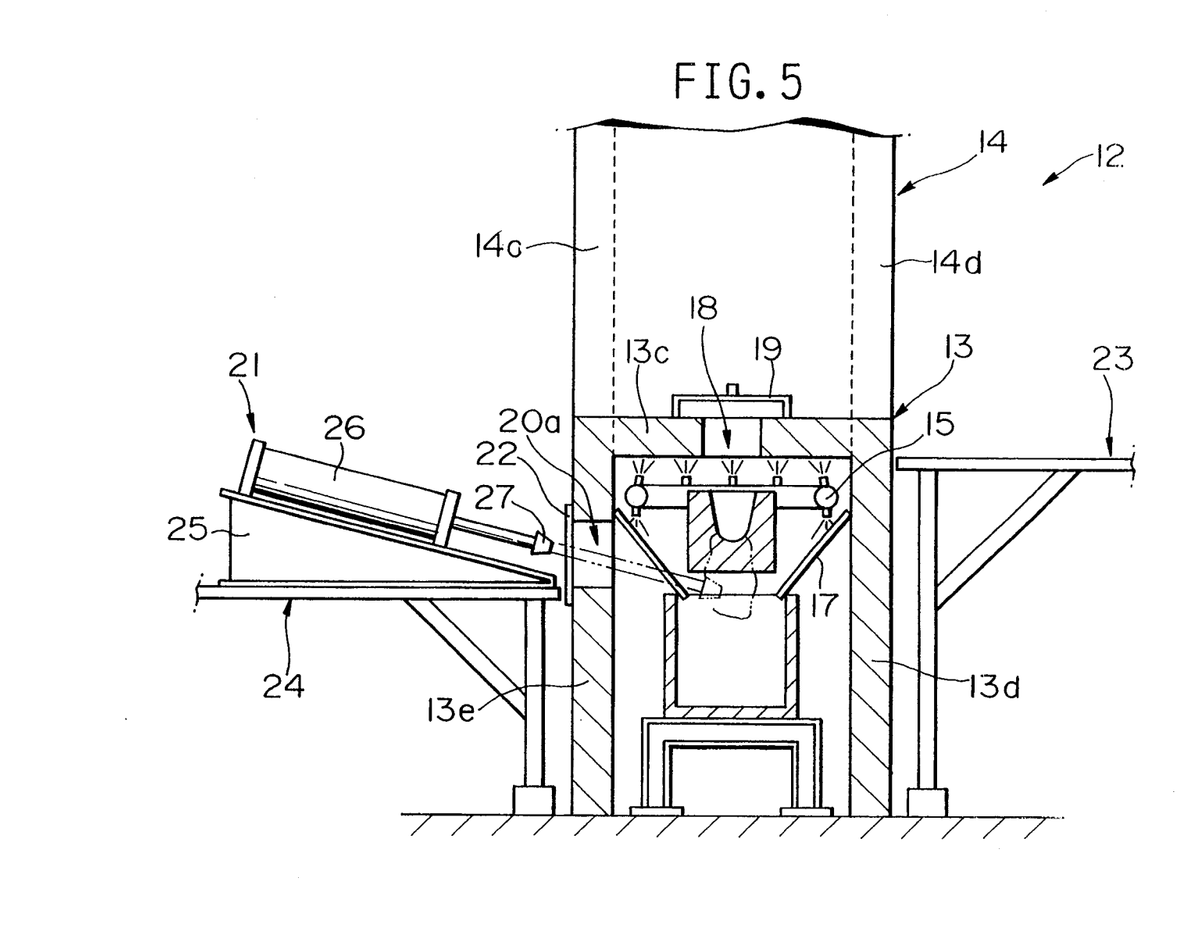
FIG. 5 is a cross-sectional view of the apparatus of FIG. 4, taken along the line V—V in FIG. 4.
Figure 6:
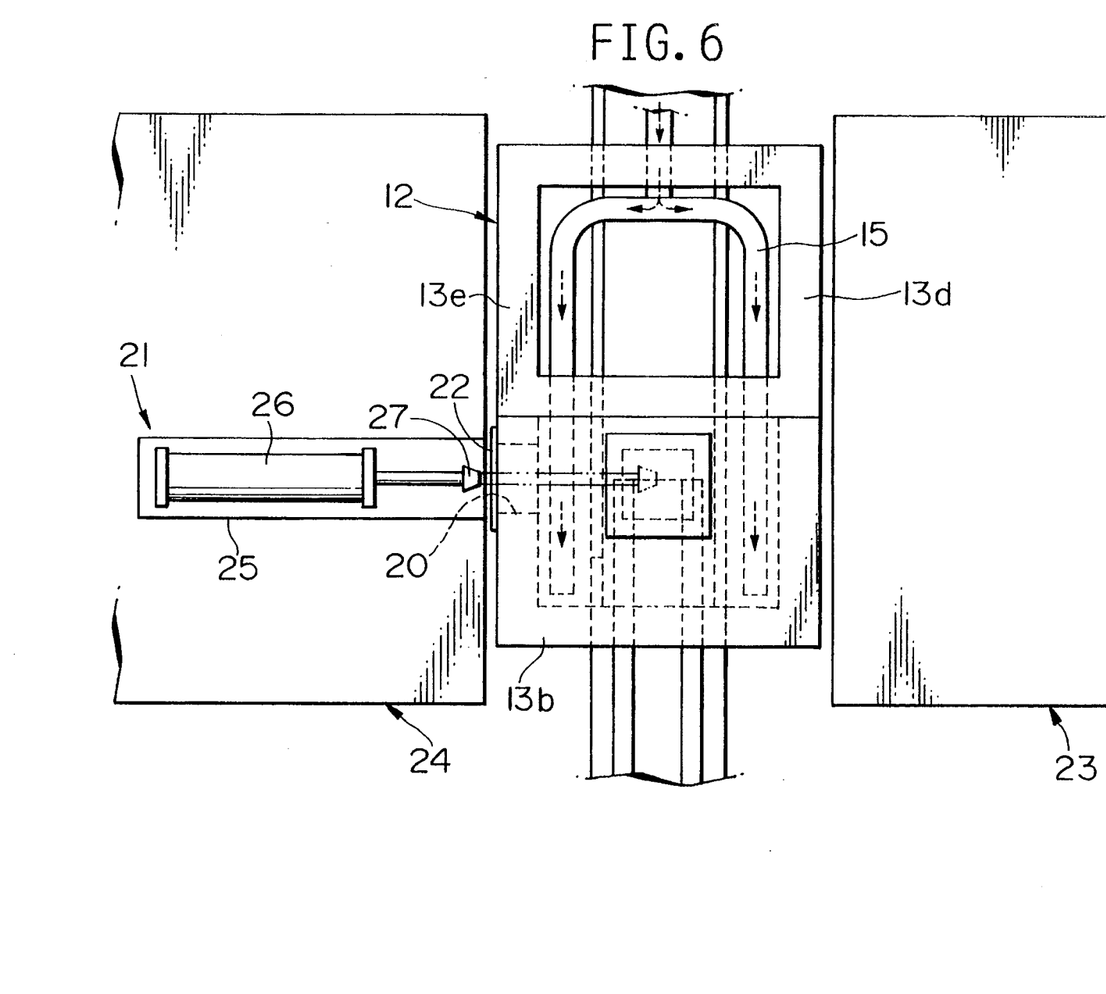
FIG. 6 is a plan view of the apparatus of FIG. 4.

FIGS. 4 to 6 depict a modified granulation apparatus in accordance with another embodiment of the invention specifically, during smelting and/or converting operations, slag may adhere to the discharging end of the discharging launder 1, being cooled and grown into solidified lumps after a prescribed duration. These solidified lumps of slag, i.e., accretion, should be removed by the operator. In addition, it is naturally required for the operator to inspect the inside of the water-granulation apparatus. Accordingly, the granulation apparatus is modified to facilitate the above removing and inspection operations.

The modified apparatus includes an explosion-proof hood 12 having a hood body 13 surrounding the discharging end of the discharging launder 1 and the receiving launder 2, and a tubular portion 14 of a rectangular cross-section extending upwards from the forward portion of the hood body 13, below which the discharging launder 1 is not located. Thus, the exhaust gas produced during water-granulation is discharged through the tubular portion 14.

The hood body 13 is defined by a front vertical wall 13a, a rear vertical wall 13b, an upper horizontal wall 13c or roof, and a pair of side vertical walls 13d and 13e lying between the front and rear walls 13a and 13b. The discharging launder 1 is inserted through the rear wall 13b thereof and terminates in the hood body 13, whereas the receiving launder 2 is inserted through the rear and front walls 13b and 13a thereof. The tubular portion 14 is defined by a front wall 14a flush with that of the hood body 13, a rear wall 14b extending upwards from the upper horizontal wall 13c thereof, and side walls 14c and 14d lying between the front and rear walls 14a and 14b and being flush with the side walls of the hood body 13.

As depicted in FIGS. 4 to 6, a cooling water conduit 15 having a great number of nozzles 16 provided thereon is disposed along the inner surfaces of the side walls 13d and 13e and the front wall 13a of the hood body 13, and a unit (not shown) for supplying cooling water is connected to the conduit 15. Thus, high pressure cooling water is supplied into the conduit 15, and is jelled, like a shower, through the nozzles 16 against the inner surfaces of the hood walls. Furthermore, a catchment member 17, which is comprised of a plurality of stainless steel plates disposed inclined with upper ends resting on the walls while lower ends are resting on the side plates 2a and 2b of the receiving launder 2, is arranged in the hood. Thus, the cooling water jelled against and falling along the hood walls is gathered by the catchment member 17 into the receiving launder 2.

Furthermore, as shown in FIGS. 5 and 6, an inspection hole 18 is formed through the upper horizontal wall 13c of the explosion-proof hood 12, which wall is located above the discharging launder 1, and a cover lid 19 for covering the inspection hole 18 is releasably attached thereto. Thus, the operator can inspect the inside of the granulation apparatus therethrough. In addition, an aperture 20 of a predetermined cross-section, which is used for the operation of a removing unit 21 of accretion adhering to the discharging launder 1, is formed through the portion of the side wall 13e of the hood body 13 proximate to the terminating end of the discharging launder 1, and a cover 22 for closing the aperture 20 is attached thereto for sliding movement.

Furthermore, a first access foothold or scaffold 23 and a second access foothold 24 are mounted adjacent to the side walls 13d and 13e of the hood 12, respectively. The first access foothold 23 is formed so as to have a height close to that of the inspection hole 18, in order to permit the operator to inspect the inside of the granulation apparatus easily through the inspection hole 18.

As depicted in FIGS. 5 and 6, the removing unit 21 is mounted on the second access foothold 24, and includes a base 25 mounted thereon, a pneumatic cylinder device 26 supported on the base 25 with its cylinder rod being extensibly directed to the aperture 22 of the hood 12, and a chipper 27 mounted on the forward end of the cylinder rod of the cylinder device 26. Thus, when the removing unit 21 is not put into use, the cover 22 is slided into a closed position in which the aperture 20 is closed. On the other hand, when the removing unit 21 is operated, the cover 22 is slided into an open position in which the aperture 20 is opened. Then, the pneumatic cylinder device 26 is activated to extend its rod to bring the chipper 27 through the aperture 22 into the hood 12 to hit the accretion adhering to the end of the discharging launder 1.

In the modified granulation apparatus as described above, the slag, being discharged from the discharging launder 1, is granulated by the high pressure granulating water jetted from the water-jetting device 3, and is received by the receiving launder 2. In this situation, due to the provision of the explosion-proof hood 12 which covers the discharging end of the discharging launder 1, molten slag is prevented from being scattered outside.

Furthermore, molten slag may contact the inner surfaces of the hood walls. However, since cooling water is supplied from the conduit 15 and is falling along the inner surfaces of the hood walls, the slag thus contacting thereat is cooled and solidified, and is gathered by the stainless steel catchment member 17 into the receiving launder 2. Therefore, the slag is certainly prevented from adhering to the hood walls.

Furthermore, with the provision of the access footholds 23 and 24, the inside of the granulation apparatus as well as the removal operation of the accretion can be inspected easily and safely.

Obviously, many further modifications and variations of the present invention are possible in light of the above teachings. For example, although in the first embodiment, the terminal end of the discharging launder 1 defines a discharging outlet, the discharging launder may be constructed so as to have an outlet at a position shifted from the terminal end. Furthermore, the cover lid 19 closing the inspection hole 18 may be formed of a heat resistant glass material so as to enable safe inspection even during the operation of the granulation. If the cooling water is also jetted upwards against the inside of the glass cover, the cover is maintained clean, so that visibility will not be lost. Furthermore, a burner may be provided so as to extend through the inspection hole into the hood in order to heat the terminal end of the discharging launder 1.

What is claimed is:
1. An apparatus for water-granulating slag, comprising:

a receiving device having an upwardly directed opening for receiving slag, said receiving device having opposite side plates to define a widthwise space therebetween; and a water-jetting device attached to said receiving device for jetting granulating water to the slag, being discharged into said receiving device, to water-granulate the slag, wherein said water-jetting device includes a plurality of partitioning plates arranged in said receiving device so as to span said widthwise space between said side plates thereof and spaced from each other so as to define a plurality of water outlets with said plurality of water outlets extending in a widthwise direction along an entirety of said widthwise space between said side plates, and a water-supplying unit attached to said receiving device for supplying the granulating water into the water outlets, whereby the granulating water supplied from said water-supplying unit is jetted from the water outlets against the slag.

2. A water-granulating apparatus as defined in claim 1, wherein said receiving device includes a receiving launder having upstream and downstream ends and inclined downwardly from said upstream end to said downstream end, and wherein said partitioning plates are disposed at said upstream end of said receiving launder to permit the granulating water to be jetted from said upstream end towards said downstream end.

3. A water-granulating apparatus as defined in claim 2, further comprising a discharging launder for discharging the slag into said receiving launder, said discharging launder having a discharging outlet arranged above said upstream end of said receiving launder such that said discharging outlet is slightly shifted downstream from said upstream end of said receiving launder.

4. A water-granulating apparatus as defined in claim 3, wherein said receiving launder has an inner width greater than said discharging launder.

5. A water-granulating apparatus as defined in claim 4, wherein said opposite side plates of said receiving launder member extend from a bottom wall of said receiving launder member and are inclined upwardly in a direction away from each other such that a spacing between said opposite side plates decreases toward said bottom wall.

6. The apparatus of claim 5, wherein opposite ends of each of said plurality of partitioning plates are connected to said side plates.

7. The apparatus of claim 5, wherein a spacing between said side plates at a top of said receiving device is greater than a width of said discharging outlet of said discharging launder.

8. A water-granulating apparatus as defined in claim 3, wherein said discharging launder has a terminal end defining said discharging outlet.

9. A water-granulating apparatus as defined in claim 3, further comprising an explosion-proof hood for surrounding a zone adjacent to said discharging outlet of said discharging launder, whereby the slag, being discharged from said discharging, launder into said receiving, launder, is prevented from being scattered.

10. A water-granulating apparatus as defined in claim 9, wherein said explosion-proof hood comprises a horizontal upper wall, said upper wall including an inspection hole formed therein and a scaffold provided thereon for access to said inspection hole.

11. A water-granulating apparatus as defined in claim 9, wherein said explosion-proof hood includes a side wall having an aperture formed therethrough so as to be adjacent to the discharging outlet of said discharging launder, whereby removing operation of accretion adhering to said discharging outlet can be carried out through said aperture.

12. A water-granulating apparatus as defined in claim 7, further comprising a cooling unit attached to said explosion-proof hood for causing cooling water to flow down along inner wall surfaces of said explosion-proof hood.

13. The apparatus of claim 9, further including a plurality of nozzles for jetting water against inner surfaces of said explosion-proof hood.

14. The apparatus of claim 13, further including a catchment member comprising a plurality of inclined plates having upper ends resting on walls of said explosion-proof hood and lower ends resting on said side plates of said receiving launder for catching cooling water jetted against said inner surfaces of said explosion-proof hood.

15. The apparatus of claim 1, wherein at least some of said plurality of partitioning plates define both an upper side of a water outlet and a lower side of a water outlet disposed thereabove.

16. The apparatus of claim 1, wherein opposite ends of each of said plurality of partitioning plates are connected to said side plates.

17. The apparatus of claim 1, further including a discharge device having a discharge opening, and wherein a spacing between said side plates at a top of said receiving device is greater than a width of said discharge opening.

18. An apparatus for water-granulating slag, comprising:
   a receiving device having an upwardly directed opening for receiving slag, said receiving device having opposite side plates to define a widthwise space therebetween; and
   a water-jetting device attached to said receiving device for jetting granulating water to the slag, being discharged into said receiving device, to water-granulate the slag;
   wherein said water-jetting device includes a plurality of partitioning plates arranged in said receiving device so as to span said widthwise space between said side plates thereof and spaced from each other so as to define a plurality of water outlets, and a water-supplying unit attached to said receiving device for supplying the granulating water into the water outlets, whereby the granulating water supplied from said water-supplying unit is jetted from the water outlets against the slag;
   wherein said receiving device includes a receiving launder having upstream and downstream ends and inclined downwardly from said upstream end to said downstream end, and wherein said partitioning plates are disposed at said upstream end of said receiving launder to permit the granulating water to be jetted from said upstream end towards said downstream end;
   a discharging launder for discharging the slag into said receiving launder, said discharging launder having a discharging outlet arranged above said upstream end of said receiving launder such that said discharging outlet is slightly shifted downstream from said upstream end of said receiving launder;
   the apparatus further comprising an explosion-proof hood for surrounding a zone adjacent to said discharging outlet of said discharging launder, whereby the slag, being discharged from said discharging launder into said receiving launder, is prevented from being scattered; and
   wherein said explosion-proof hood comprises a horizontal upper wall, said upper wall including an inspection hole formed therein and a scaffold provided thereon for access to said inspection hole.

19. An apparatus for water-granulating slag, comprising:
   a receiving device having an upwardly directed opening for receiving slag, said receiving device having opposite side plates to define a widthwise space therebetween; and
   a water-jetting device attached to said receiving device for jetting granulating water to the slag, being discharged into said receiving device, to water-granulate the slag;
   wherein said water-jetting device includes a plurality of partitioning plates arranged in said receiving device so as to span said widthwise space between said side plates thereof and spaced from each other so as to define a plurality of water outlets, and a water-supplying unit attached to said receiving device for supplying the granulating water into the water outlets, whereby the granulating water supplied from said water-supplying unit is jetted from the water outlets against the slag;
   wherein said receiving device includes a receiving launder having upstream and downstream ends and inclined downwardly from said upstream end to said downstream end, and wherein said partitioning plates are disposed at said upstream end of said receiving launder to permit the granulating water to be jetted from said upstream end towards said downstream end;
   a discharging launder for discharging the slag into said receiving launder, said discharging launder having a discharging outlet arranged above said upstream end of said receiving launder such that said discharging outlet is slightly shifted downstream from said upstream end of said receiving launder;
   the apparatus further comprising an explosion-proof hood for surrounding a zone adjacent to said discharging outlet of said discharging launder, whereby the slag, being discharged from said discharging launder into said receiving launder, is prevented from being scattered; and
   wherein said explosion-proof hood includes a side wall having an aperture formed therethrough so as to be adjacent to the discharging outlet of said discharging launder, whereby a removing operation of accretion adhering to said discharging outlet can be carried out through said aperture.

20. The apparatus of claim 19, further including an actuator having a chipper mounted thereon, wherein said actuator extends said chipper through said aperture for removing accretion.

* * * * *